United States Patent [19]

Fowler

[11] Patent Number: 4,725,995

[45] Date of Patent: Feb. 16, 1988

[54] SYSTEM FOR REMOVABLY HOUSING AND ALIGNING COMPONENTS IN A TOWED ARRAY

[75] Inventor: John T. Fowler, Marblehead, Mass.

[73] Assignee: The Laitram Corporation, New Orleans, La.

[21] Appl. No.: 585,027

[22] Filed: Mar. 5, 1984

Related U.S. Application Data

[63] Continuation-in-part of Ser. No. 444,073, Nov. 24, 1982, Pat. No. 4,631,711.

[51] Int. Cl.$^4$ .............................. G01J 1/30; H04R 1/44
[52] U.S. Cl. ....................................... 367/149; 367/15; 181/112; 439/296; 174/101.5
[58] Field of Search .................... 181/110, 112; 367/15, 367/149, 154, 177, 178, 188; 439/296; 114/249, 252; 174/101.5

[56] References Cited

U.S. PATENT DOCUMENTS

| | | | |
|---|---|---|---|
| 3,611,975 | 10/1971 | Ashbrook | 114/235 B |
| 3,648,642 | 3/1972 | Fetrow et al. | 114/235 B |
| 3,786,410 | 1/1974 | Hazelhurst | 367/177 |
| 3,909,774 | 9/1975 | Pavey | 181/112 |
| 3,931,608 | 1/1976 | Cole | 367/154 |
| 3,953,827 | 4/1976 | Le Moal et al. | 367/15 |
| 4,204,188 | 5/1980 | Weichart et al. | 439/296 |
| 4,231,111 | 10/1980 | Neeley | 367/19 |
| 4,264,115 | 4/1981 | Chow | 439/296 |
| 4,300,218 | 11/1981 | Kruka et al. | 367/165 |
| 4,631,711 | 12/1986 | Fowler | 367/149 |

FOREIGN PATENT DOCUMENTS

| | | | |
|---|---|---|---|
| 0648248 | 9/1962 | Canada | 367/154 |
| 1543674 | 9/1968 | France | 367/154 |
| 2437076 | 9/1978 | France | 439/296 |

Primary Examiner—Nelson Moskowitz
Attorney, Agent, or Firm—Weingarten, Schurgin, Gagnebin & Hayes

[57] ABSTRACT

A cartridge retention system includes a cartridge carrying electronic, compressed gas or other components which has a spring-loaded button at one end and which is removably mounted in the breech of an adapter module connected either in a streamer section or between opposing ends of adjacent streamer sections of a towed array. The cartridge is demountably retained within the adapter by providing an adapter housing with a breech which is somewhat longer than the cartridge, and by providing the housing with an overlying two part shell which is rotatable about the housing, with one of the shell parts containing an aperture to accommodate cartridge insertion and with both parts containing an internal circumferential groove adapted to coact with the spring-loaded button on the cartridge to move the cartridge from one end of the breech to the other end upon rotation of the shell. The part of the shell opposite that containing the cartridge insertion aperture is provided with a button retaining aperture such that upon a 180° revolution of the shell, the button is captured in the button retaining aperture to secure the cartridge in the breech such that the cartridge is pressed to the opposing end of the breech and into a connector at the opposing end. When the cartridge is inserted through the shell and into the breech, the button is depressed prior to rotating the shell, with the groove-button camming action forcing the cartridge to the opposite end of the breech.

16 Claims, 14 Drawing Figures

SYSTEM FOR REMOVABLY HOUSING AND ALIGNING COMPONENTS IN A TOWED ARRAY

RELATED PATENT APPLICATIONS

This is a continuation-in-part of U.S. patent application Ser. No. 444,073, filed Nov. 24, 1982 by John T. Fowler, now U.S. Pat. No. 4,631,711.

FIELD OF THE INVENTION

This invention relates to towed arrays and more particularly to a system for removably housing and aligning electronic or other components within an adapter module.

BACKGROUND OF THE INVENTION

As outlined in U.S. patent application Ser. No. 444,083, filed Nov. 24, 1982, by John T. Fowler, entitled System for Removably Housing and Aligning Components in a Towed Array, and assigned to the assignee hereof, which application is included herein by reference, for present seismic streamer positioning applications, depth, heading and hence position of an individual sections of seismic streamer cable can be determined and controlled either through the utilization of internally mounted sensors or externally mounted pods, which are clamped onto the seismic streamer at various locations, with the electronics being hard-wired, or in the case of pods, being battery operated and inductively coupled through the streamer casing to cables within the streamer. Examples of the pod type systems include U.S. Pat. Nos. 3,931,608; 3,611,975; 3,704,681; 3,673,556; 3,648,642; and 3,531,761. The mounting of sensing devices wholly within the streamer has the advantage that the electronics are contained wholly within the stream free from damage and, unlike pods, need not be removed upon reeling in on the drum used to store the cable. Examples of these types of systems are described in U.S. Pat. Nos. 4,160,299 and 3,909,774.

In the above-noted patent application, a system for internally housing electronics in an adapter module is described which includes a breech-loaded adapter module which is connected either in a streamer section between adajacent streamer segments or between opposing ends of seismic streamer sections, with a cartridge carrying the electronics, sensors, and/or other components being forced into the breech of the adapter module by an over-the-center lever action cartridge retention system.

The cartridge mounted in the breech is aligned by the sidewalls of the breech to the longitudinal axis of the module, with the module in turn being aligned to the longitudinal axis represented by one of the strain member. Other strained members running through and carried by the module by clamping the module to the strain members are loosely carried in and run through the adapter module, with the result being that the alignment of the sensor within the cartridge is keyed and uniquely determined by one and only one of the strain members. Were the housing clamped to two or more strain members, differential forces produced by the clamped strain members would contort the adapter module housing, thereby causing a misalignment between the longitudinal axis of the cartridge and the strain members.

Not only is such a cartridge useful for carrying various electronics useful in seismic exploration, the cartridge is also useful to carry compressed air or gas in the form of a $CO_2$ cartridge such that a broken stream cable may be recovered by the puncturing of the $CO_2$ cartridge, which results in the floating of the cable.

As mentioned in the above patent application, the cartridge is pressed to one end of the breech by an over-the-center locking mechanism. A number of connector pins are provided in a connector at the end of the breech to which the cartridge is moved by the lever-actuated locking mechanism. This connects the cartridge which is inserted into the breech to other electronics which may be carried within the adapter module or to the cables within the streamer. In order to accomplish such a connection, a connector is provided at the far end of the breech.

The advantages of the aforementioned adapter module are first that with the cartridge flush with the outer casing of the module, no flow anomalies are introduced, such as the flow anomolies introduced by the aforementioned pods. Secondly, unlike pods which must be removed when deploying or reeling in the cable, the cartridges need not be removed during cable pay-out or retrieval. Thirdly, the easy removability of the cartridge permits access to a damaged, broken or malfunctioning electrical or other unit without either invasion of the sealed streamer section or the removal of the pods.

As noted in the above patent application, with respect to miniaturization, depth sensors and heading sensors can now be made to a maximum one inch diameter, thereby permitting their mounting in a suitably small cartridge. The cartridge system provides a rigid short streamer section which is guaranteed to be parallel to one of the three strain members, thereby providing, at least for compasses, that the control axis is perfectly parallel to the axis of the streamer. It should be noted that the housing of the above patent application allows strain members of nonmagnetic material to be run through the housing. This provides for ready compensation since an identical housing and strain member can be fixtured at the factory and a cartridge introduced into the breech of the adapter module for compensation purposes. Since both adapter modules and strain members are identical, inserting a calibrated cartridge in the field does not alter the pre-alignment calibration. Finally, the aforementioned adapter module may be placed in active acoustic sections while still providing accessiblity for calibration repair. This has the advantage of not breaking the spacing of acoustic arrays of hydrophones, resulting in a mathematically simpler model.

While the over-the-center latch system described above is satisfactory for mounting cartridges within an adapter module, the over-the-center latch system is somewhat mechanically complicated, expensive to manufacture, and results in the cartridge being exposed to severe mechanical forces when wound on the storage drum or when travelling through the fair-lead or idler pulley at the stern of the boat during pay-out or retrieval.

SUMMARY OF THE INVENTION

In contradistinction to the over-the-center latching mechanism described above, the subject cartridge is provided with an extension at one end which contains a spring-loaded button. The breech of the adapter module is extended to accommodate the extension on the cartridge and the module housing is provided with an overlying sheel which is rotatable about the housing and which contains through one surface an aperture corresponding to the breech and on a diametrically opposite surface an aperture which is adapted to retain the spring-loaded button. The interior walls of the shell are provided with an internal channel or groove such that when the cartridge is inserted into the breech through the aperture in the shell and the button is depressed, when rotating the sheel, the button slips into the shell groove and as the shell rotates relative to the housing, the plane of the circumferential groove is canted with respect to the longitudinal axis of the adapter module such that the button is cammed toward the other end of the breech. This forces the cartridge to the other end of the breech and into contact with the associated connector. Upon full 180° rotation of the shell with respect to the housing, the button falls into the buttom retaining aperture which locks the cartridge in place in the breech.

In summary, the subject cartridge retention system includes a cartridge which moves smoothly through stern-mounted fair-leads or pulleys and which winds up with the cable on the storage drum without damage. The cartridge is adapted to carry electronic, compressed gas or other components, and is removably mounted in the breech of an adapter module connected either in a stream section or between opposing ends of adjacent streamer sections of the towed array, in which the cartridge is demountably retained within the adapter by providing an adapter housing with a breech which is somewhat longer than the cartridge, and by providing the housing in one embodiment with an overlying two-part shell which is rotatable about the housing, with one of the parts containing an aperture to receive the cartridge and with both parts containing an internal circumferential groove adapted to coact with a spring-loaded button on the cartridge to move the cartridge from one end of the breech to the other end upon rotation of the shell. The part of the shell opposite that contaiing the cartridge insertion aperture is provided with a button retaining aperture such that upon a revolution of 180° of the shell, the button is captured in the button retaining aperture to secure the cartridge in the breech such that the cartridge is pressed to the opposing end of the breech and the connector contained thereat. The cartridge itself is of a size to be accommodated snugly within the breech and at one end has an extension with a spring-loaded button which, when the cartridge is inserted through the shell and into the breech, is depressed prior to rotating the shell to force the cartridge to the opposite end of the breech by virtue of the coaction of the button with the internal groove of the shell.

The cartridge may house any type of electronics, sensors, compasses or other devices and may, in particular, house a $CO_2$ cartridge and associated nose-piercing electromechanical device such that, when the electromechanical device is actuated, the $CO_2$ cartridge is punctured and the gas is permitted to escape into the streamer for flotation purposes. Alternatively, this gas may be channeled into an expandable boot over the adapter module for the flotation of the streamer, or into a long skinny balloon inside the streamer.

BRIEF DESCRIPTION OF THE DRAWINGS

These and other features of the subject invention will be better understood in connection with the detailed description taken in conjunction with the drawings in which.

DETAILED DESCRIPTION

Figure 1:
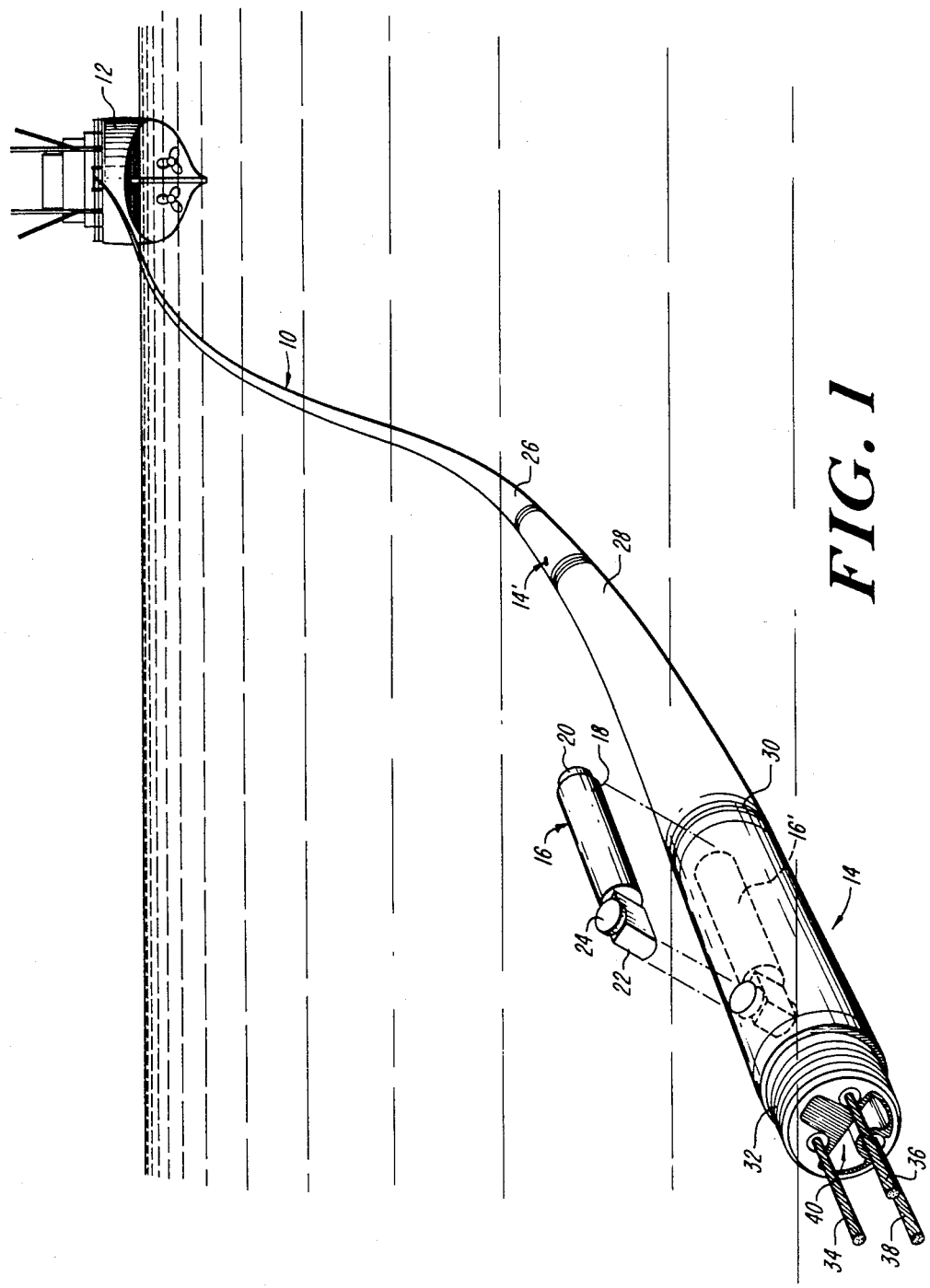
FIG. 1 is a diagrammatic representation of the adapter module illustrating a cartridge to be inserted therein in which the cartridge carries a spring-loaded button.

In order to accommodate electronic, compressed gas or other components within a seismic streamer cable, and referring now to FIG. 1, a stream cable 10 from a vessel 12 is illustrated as including adapter modules 14, each of which are adapted to receive cartridges 16 which in general include a cylindrical housing 18, a connector portion 20, and an extension 22 carrying a spring-loaded member in the form of a button or disc 24. This cartridge is inserted into adapter module 14 such that it lies within the adapter module as illustrated by the dotted outline 16'.

As illustrated, adapter module 14' lies between two streamer sections 26 and 28 with adapter module 14 being positioned at end 30 of streamer section 28. The adapter module has a circumferentially grooved end portion 32 onto which the sheathing of a streamer section may be clamped. Each of the adapter modules includes strain members 34, 36 and 38 which run through the housing, with one of the strain members being clamped to the housing so as to align the longitudinal axis of the housing with the strain member. In this manner the adapter module is aligned with the longitudinal center line of the streamer. The adapter module is also provided with an interior channel 40 through which streamer cables pass.

Figure 2:
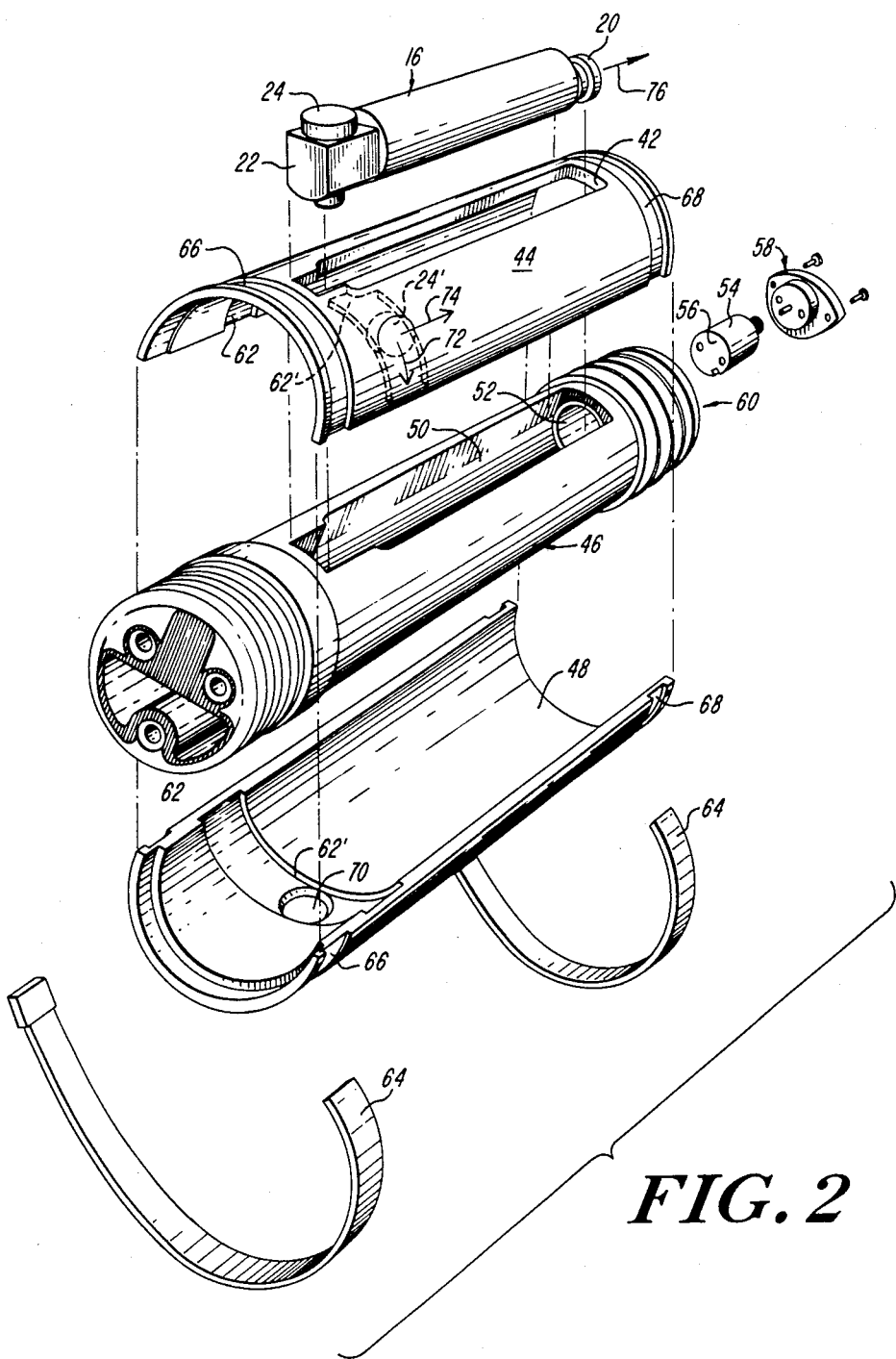
FIG. 2 is a diagrammatic and exploded view of the subject cartridge retention system illustrating a two section shell having a cartridge receiving aperture, a cartridge button retaining aperture and an internal groove or channel.

In order to achieve the ready insertion and removal of the cartridge and referring now to FIG. 2, cartridge 16 is inserted through an aperture 42 within an upper section 44 of the shell adapted to be carried by adapter module housing 46 such that this shell section in conjunction with a mating lower shell section 48 is adapted to rotate about the longitudinal axis of housing 46.

Housing 46 is provided with a breech 50 having an end 52 into which is inserted an electrical connector 54 such that the face 56 of the electrical connector protrudes into the breech. The electrical connector is in turn connected to a connector end plate 58 which is mounted to end 60 of housing 46.

Each of sections 44 and 48 are provided with an interior crircumferential groove or channel 62 the plane of which is canted with respect to the center line such that the portion 62' of channel 62 lies to the right of portion 62" which is exposed at aperture 42 to extension 22 of cartridge 16 and also to button 24.

The two halves of the shell are clamped over housing 46 via straps 64 which ride in respective grooves 66 and 68 in the two halves of the shell. A button retaining aperture 70 is provided in shell section 48 within groove 62 to capture the spring-loaded button as will be described hereinafter. Note, the shell can be of a unitary one-part construction.

With the two halves of the shell clamped into place, the shell acts as a unitary body which can revolve or rotate about housing 46. In order to insert cartridge 16 into breech 50 the shell is rotated to the position shown such that aperture 42 overlies breech 50. Thereafter the cartridge is inserted into the breech and button 24 is pressed down so that it can ride within channel 62 when the shell is rotated in either direction. With respect to FIG. 2, rotation of a shell in a counterclockwise direction results in button 24 residing in channel 62 as illustrated at 24', with the rotation of the shell in a counterclockwise direction resulting in the relative movement of button 24' in the direction of arrow 72. Since channel 62 is canted, the button moves longitudinally in the direction of arrow 74 as the shell is rotated about the adapter housing, thereby to move cartridge 16 in the direction of arrow 76 towards connector 54.

Figure 3:
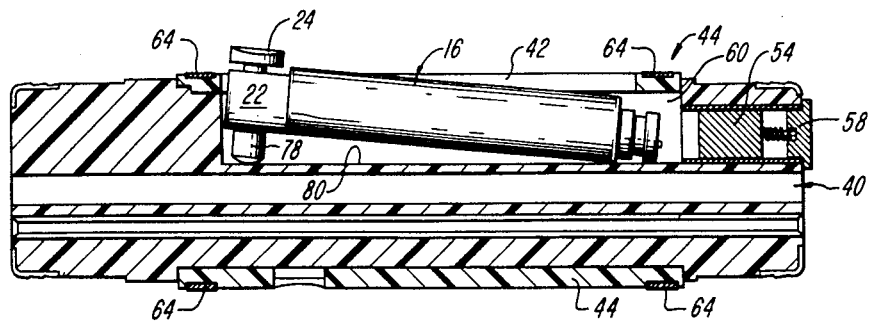
FIGS. 3, 4, 5 and 6 are cross-sectional and diagrammatic illustrations of the process for mounting a cartridge in the breech of the adapter module of FIG. 2.

This series of actuations is illustrated in FIGS. 3–6 where, in FIG. 3 cartridge 16 is inserted through aperture 42 in shell section 44 such that a spring-loaded projection 78 rests against floor 80 of breech 50.

Figure 4:
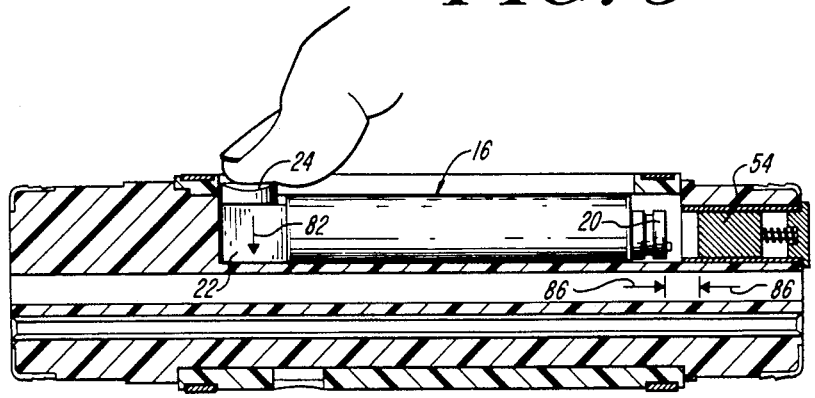
Figure 5:
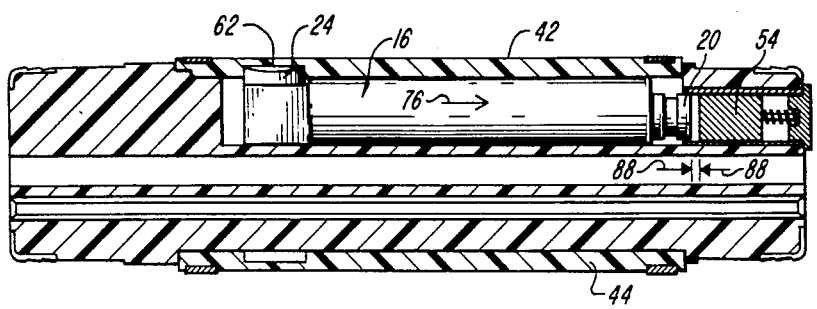

Referring to FIG. 4, button 24 is depressed in the direction of arrow 82 such that projection 78 is pushed up flush with the bottom of extension 22 and button 24, as illustrated in FIG. 5 is positioned in channel 62 as the shell comprising sections 42 and 44 is rotated counterclockwise. As mentioned in connection with FIG. 2, this causes cartridge 16 to move in the direction of arrow 76 towards connector 54. The original spacing between the end of the cartridge and the connector at the end of the breech is illustrated by double ended arrow 86, whereas the camming action on the button produced by the channel causes the distance between connector 20 and connector 54 to decrease as indicated by double ended arrow 88.

Figure 6:
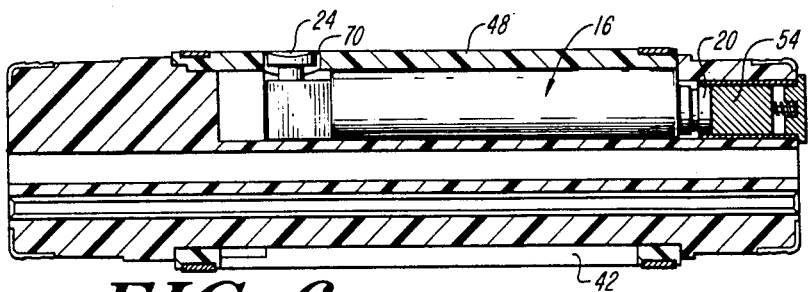

Referring to FIG. 6, when the shell is rotated 180° such that aperture 42 faces downwardly, button 24 falls into aperture 70 in shell section 48, thereby to lock cartridge 16 into position in the breech such that connector 20 mates with connector 54 as illustrated.

In order to remove cartridge 16, all that is necessary is to depress button 24 and rotate the shell another 180° until aperture 42 is in line with breech 50 at which point the spring-loaded projection 78 ejects the cartridge.

Figure 7A:
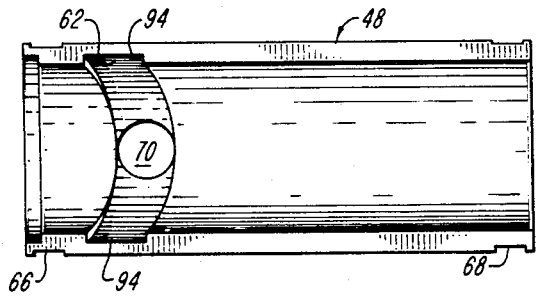
FIGS. 7A and 7B are diagrammatic views of the lower section of the shell of FIG. 2 taken from opposite sides thereof.
Figure 7B:
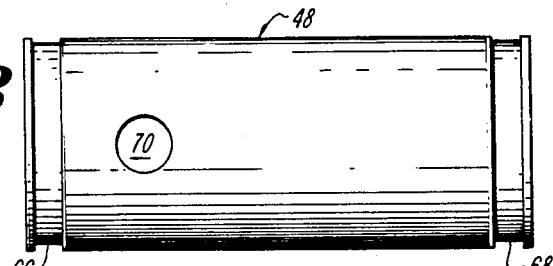
Figure 8A:
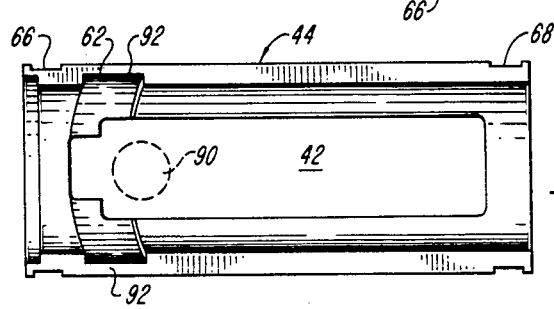
FIGS. 8A and 8B are diagrammatic views of the upper section of the shell of FIG. 2 taken from opposite sides thereof.
Figure 8B:
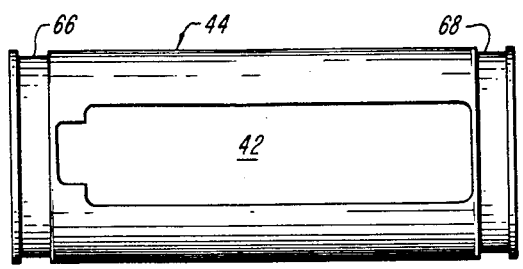

Referring now to FIGS. 7A and 7B, shell section 48 is illustrated from two directions, one illustrating the interior of the shell with the other illustrating the exterior. Here, as can be seen, channel 62 is bowed to the right with aperture 70 being considerably to the right of the corresponding initial button position as illustrated in FIG. 8 by dotted circle 90. Referring to FIG. 8A, channel 62 communicates with aperture 42 such that the button can enter into channel 62. Again note that channel 62 in this section is bowed to the left with the end 92 of channel 62 in section 44 being aligned with the ends 94 of channel 62 in section 48. The result is a circumferential channel which lies in a plane which is oblique with respect to the center line of the shell. This causes the aforementioned camming action when the button coacts with the channel as the shell is rotated from its initial position to its final position.

Figure 9:
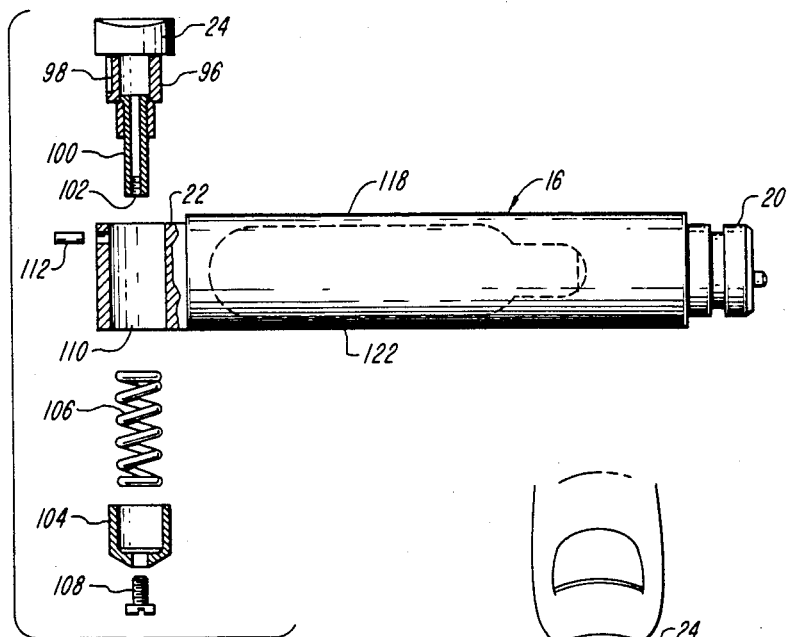
FIG. 9 is a diagrammatic and cross-sectional illustration of the cartridge of FIG. 2 in exploded view illustrating the spring-loaded button structure thereof.

Referring now to FIG. 9, a detail of cartridge 16 is shown in which spring loaded button 24 is mounted on a slotted hollow shaft 96 into which protrudes a hollow shaft 100 having screw threads 102 at the base thereof.

The spring-loaded configuration is completed by a spring-loaded projection in the form of an end cap 104 which carries a spring 106 therein. The cap is screwed onto hollow shaft 100 by a bolt 108, with cap 104 and shaft 96 loosely riding within a channel 110 within extension 22. When mounted, a pin 112, which lies in slot 98, secures the spring-loaded button to extension 22 so that it has limited travel within channel 110.

Figure 10:
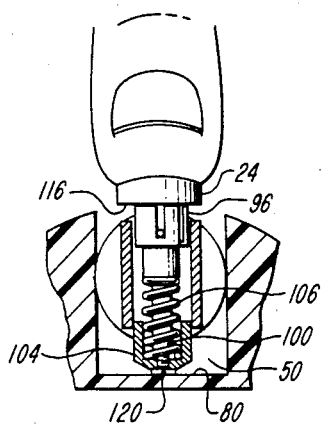
FIG. 10 is a cross-sectional and end view of the cartridge of FIG. 7.

Referring to FIG. 10, the situation is depicted when the cartridge is within breech 50 such that cap 104 lies against the bottom 80 of breech 50. When button 24 is depressed downwardly, spring 106 is depressed with shaft 100 being pressed up into shaft 96 until the bottom surface of the button 116 lies flush with the top surface 118 of cartridge 16. Likewise, when fully depressed, the bottom 120 of cap 104 lies flush with surface 122 of cartridge 16. At this point the shell may be rotated to lock the cartridge into the adapter module.

Figure 11:
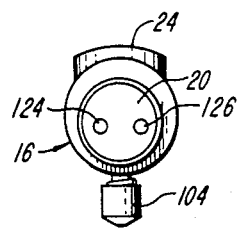
FIG. 11 is an end view of the cartridge of FIG. 9.

Referring to FIG. 11, an end view of cartridge 16 is illustrated in which button 24 and cap 104 are shown in the position illustrated, with connector 20 being shown as having channels 124 and 126 to receive contact pins from connector 54.

Figure 12:
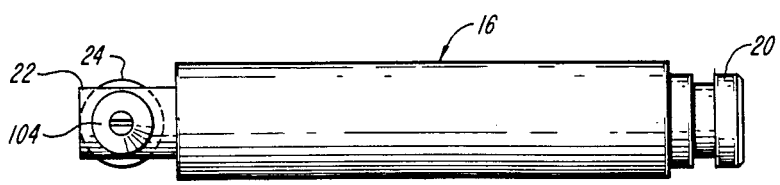
FIG. 12 is a bottom view of the cartridge of FIG. 9.

FIG. 12 is a bottom view of cartridge 16 illustrating the position of cap 104 and button 24 on extension 22.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A cartridge retention system for use with a seismic streamer comprising:
    a cartridge having a member biased away from the centerline of said cartridge;
    an adapter module for removably housing said cartridge, said adapter module adapted to be secured to a portion of said seismic streamer, said module including an adapter housing having a breech adapted to receive said cartridge, said breech being longer than said cartridge; and
    a shell overlying said housing and adapted to rotate thereabout, said shell having an aperture adapted to receive said cartridge therethrough and an internal groove adapted to receive said member upon insertion of said cartridge in said breech, said groove being configured to urge said member and thus said cartridge to the one end of said breech upon cartridge insertion into said breech and rotation of said shell about said housing.

2. The cartridge retention system of claim 1 wherein said member includes a button and wherein said shell includes a button receiving aperture through a portion of said groove.

3. The cartridge retention system of claim 1 wherein said member is spring loaded.

4. The cartridge retention system of claim 3 wherein said member includes a button and wherein said cartridge includes an extension at one end thereof, said extension having a bore therethrough, said spring loaded button having a portion mounted through said bore, with said portion including an end cap adapted to coact with the bottom of said breech, a sleeve mounted to said button and a spring between said cap and said button.

5. The cartridge retention system of claim 4 and further including means for retaining said button portion within said extension bore.

6. The cartridge retention system of claim 1 wherein said shell is tubular.

7. The cartridge retention system of claim 6 wherein said shell is divided into two halves, each having a semicircular cross-section, and further including circumferential bands at each end of said shell halves for clamping said shell halves together into a tube.

8. The cartridge retention system of claim 7 wherein each end of each shell halves includes a band-retaining groove.

9. The cartridge retention system of claim 1 wherein said one end of said breech includes an electrical connector and wherein one end of said cartridge includes mating electrical connectors such that when said cartridge is moved by the rotation of said shell towards said one end of said breech, said connectors mate.

10. The cartridge retention system of claim 1 wherein said member is mounted at one end of said cartridge and wherein said groove is configured to urge said member and said cartridge to the end of said breech opposite said one cartridge end.

11. The cartridge retention system of claim 1 wherein said groove is circumferential and is canted with respect to the centerline of said adapter module.

12. A cartridge retention system for use with a seismic streamer comprising:

a cartridge having a button at one end, said button being biased away from the centerline of said cartridge;

an adapter module for removably housing said cartridge, said adapter module adapted to be secured to a portion of said seismic streamer and including an adapter housing having a breech adapted to receive said cartridge, said breech being longer than said cartridge; and a cylindrical shell overlying said housing and adapted to rotate thereabout, said shell having a diameter equal to that of the outside diameter of said streamer, said shell having an aperture adapted to receive said cartridge therethrough and an internal groove adapted to receive said button upon insertion of said cartridge in said breech, said groove being configured to urge said button and thus said cartridge to the end of said breech opposite the end at which said button resides upon cartridge insertion into said breech and rotation of said shell about said housing.

13. The cartridge retention system of claim 12 wherein said shell includes a button receiving aperture through a portion of said groove.

14. The cartridge retention system of claim 12 wherein said button is spring loaded.

15. The cartridge retention system of claim 12 wherein said shell is divided into two halves, each having a semicircular cross-section, and further including circumferential bands at each end of said shell halves for clamping said shell halves together into a tube.

16. The cartridge retention system of claim 15 wherein each end of each shell halves includes a band-retaining groove.

* * * * *

UNITED STATES PATENT AND TRADEMARK OFFICE
CERTIFICATE OF CORRECTION

PATENT NO. : 4,725,995

DATED : Feb. 16, 1988

INVENTOR(S) : John T. Fowler

It is certified that error appears in the above-identified patent and that said Letters Patent is hereby corrected as shown below:

Abstract, line 2, "electronic," should read --electronics,--

Column 1, line 18, "444,083" should read --444,073--
line 36, "stream" should read --streamer--
line 39, "U.S. Pat. Nos. 4,160,299" should read --U.S. Pat. Nos. 4,160,229--
line 44, "adajacent" should read --adjacent--
lines 53-56 "one of the strain member. Other strained members running through and carried by the module by clamping the module to the strain members are" should read --one of the strain members running through and carried by the module by clamping the module to the strain member. Other strain members are--
line 68, "stream cable" should read --streamer cable--

Column 2, line 17, "anomolies" should read --anomalies--
line 68, "sheel" should read --shell--

Column 3, line 8, "sheel," should read --shell,--
line 23, "electronic," should read --electronics,--
line 26, "stream section" should read --streamer section--
line 39, "contaiing" should read --containing--

UNITED STATES PATENT AND TRADEMARK OFFICE
CERTIFICATE OF CORRECTION

PATENT NO. : 4,725,995

DATED : Feb. 16, 1988

INVENTOR(S) : John T. Fowler

It is certified that error appears in the above-identified patent and that said Letters Patent is hereby corrected as shown below:

```
Column 4, line 23, "FIG. 7;" should read --FIG. 9;--
          line 28, "electronic," should read --electronics,--
          line 30, "stream cable 10" should read --streamer
                                                  cable 10--
```

Signed and Sealed this

Second Day of May, 1989

Attest:

DONALD J. QUIGG

*Attesting Officer*

*Commissioner of Patents and Trademarks*